United States Patent

Pfaller et al.

[11] Patent Number: 5,634,968
[45] Date of Patent: Jun. 3, 1997

[54] CARBONATE CONTAINING MINERAL FILLERS MORE PARTICULARY FOR USE AS MATTING AGENTS

[75] Inventors: Harald Pfaller, Wangen bei Olten; Dieter Strauch, Zofingen AG, both of Switzerland

[73] Assignee: Pluess-Staufer AG, Oftringen, Switzerland

[21] Appl. No.: 437,637

[22] Filed: May 9, 1995

[30] Foreign Application Priority Data

May 13, 1994 [DE] Germany ............ 44 16 895.0

[51] Int. Cl.$^6$ ............... C09C 1/02; C01F 11/18
[52] U.S. Cl. ............... 106/286.6; 106/287.35; 106/464; 423/430
[58] Field of Search ............... 106/464, 286.6, 106/287.35; 423/430

[56] References Cited

U.S. PATENT DOCUMENTS

| | | | |
|---|---|---|---|
| 3,197,322 | 7/1965 | Maskal et al. | 106/464 |
| 4,279,661 | 7/1981 | Strauch et al. | 423/430 |
| 4,559,214 | 12/1985 | Howard et al. | 423/430 |
| 4,732,748 | 3/1988 | Stewart et al. | 423/430 |
| 4,793,985 | 12/1988 | Price et al. | 423/430 |
| 5,084,254 | 1/1992 | Golley | 423/430 |
| 5,292,365 | 3/1994 | Delfosse . | |

FOREIGN PATENT DOCUMENTS 41 28 570 A1  3/1993  Germany.

*Primary Examiner*—Wayne Langel
*Attorney, Agent, or Firm*—Townsend and Townsend and Crew LLP

[57] ABSTRACT

Carbonate containing mineral fillers, and more particularly natural and/or precipitated calcium carbonates, characterized by the following grain size distribution:

| | |
|---|---|
| <61 μm: | 100% |
| <56 μm: | 95–100% |
| <40 μm: | 90–100% |
| <20 μm: | 48–95% |
| <10 μm: | 15–52% |
| <5 μm: | 9–28% |
| <1 μm: | 0–10% |
| $d_{50}$: | 9.6–20.5 μm | may with advantage be employed as mineral fillers, preferably as matting agents and in a more especially preferred fashion for aqueous paint systems.

5 Claims, No Drawings

CARBONATE CONTAINING MINERAL FILLERS MORE PARTICULARY FOR USE AS MATTING AGENTS

BACKGROUND OF THE INVENTION

The invention relates to novel carbonate containing mineral fillers, more particularly natural and/or precipitated calcium carbonates, which may advantageously be employed as matting agents, more especially matting agents for aqueous coating systems.

Dispersion paints are coating materials, which are utilized for the protection and optical embellishment of building structures. Interior dispersion paints for use in buildings protected against the elements constitute the most important and largest group in this respect.

Frequently a dull to, at most, silk sheen impression is desired for coated walls. The aim of providing such impression is something having to be fulfilled by paints. In order to ensure that paints possess minimum gloss, matting agents must be added to the paints, which suppress directional reflection of light to a very substantial extent.

Matting agents are classified as fillers and are characterized by special grain properties, which contribute to a reduction in gloss of a paint surface. Gloss reduction is caused by the systematic creation of finest-roughness (micro-roughness) of the paint surface so that the dispersion of light is increased and directional reflection is reduced.

Micro-roughness may be produced in various ways: in the case of paints with a continuous binding agent skin on the surface it is caused by incorporating a suitable quantity of particles which are coarser than the rest of the components and which then give rise to a homogeneous "hill landscape". In this respect attention is to be paid to the resulting overall grain size distribution of all solid components. If there is an insufficient coarse fraction, there is an "island effect" which is characterized by individual grains projecting like islands from a homogeneous, smooth film. With the naked eye it is then possible to detect such grains as low-gloss structures in the shining overall film.

Super-critical paints, whose binding agent fraction is insufficient to encase all solid components completely and additionally to fill up the narrowing cusp-like gaps between the individual grains, offer another possibility for reducing gloss. Owing to the lack of binding agent the dry paint film contains air pores. Such pores, which result in openings at the surface, cause surface discontinuities and consequently roughness. Accordingly the gloss level of super-critical paints is generally lower than is the case with sub-critical ones. If a very porous filler (with a high internal surface) is added, such filler will take up binding agent in its pores, accordingly increasingly the formation of air pores in the paint film and hence lowering the degree of gloss. If such porous filler (for example diatomaceous earth) is coarser than the remaining components, there will be additionally the matting effect described in the case of sub-critical paints owing to there being a change in grain (→"hill landscape formation").

In the literature material is to be found on matting high-gloss paints to a medium gloss level (Huemmer T. F., Wasowski L. A., Plooy R. J.: "Pigmentation of radiation curable systems", "Journal of Paint Technology" vol. 44, No. 572, September 1972, pages 61 through 74).

There is no literature on the subject of additional matting in the semi-matt to matt range, that is to say paints which already have a very low initial gloss level. Matting agents are not only employed for dispersion paints but for all paints and varnishes whose degree of gloss is to be reduced. Examples are UV curing paints, polyurethane varnishes or also plastic coatings.

The most widely employed matting agent for all these applications and more particularly for dispersion paints, consists of more or less pure silicon dioxide ($SiO_2$). It is extracted from natural deposits or is produced synthetically. As a natural silicon dioxide for matting purposes its porous form is employed, which is known as diatomaceous earth, diatomite, siliceous earth or kieselguhr. In this respect it is a question of a white, yellowish or gray friable mineral, which is very porous, light and fine grained. Mineralogically such material contains opal as its main mineral, in addition to which, dependent on its degree of purity, it either contains no further components or contains clay minerals and/or other silicates. Such diatomaceous earth is employed as a matting agent either directly or after calcination. The characteristic features are a high porosity and specific surface as well as a low bulk density.

In addition to silicon oxide hollow polymer spheres with a grained surface, lamellar silicates such as mica and talcum and cellulose fibers are also employed as matting agents. While hollow polymer spheres have no significance as matting agents for dispersion paints and lamellar silicates are merely utilized as parts of components, which by themselves do not possess any potent matting action, by using cellulose fibers an effective reduction in gloss may be produced. Alongside silicon oxide products they constitute the most important group of matting agents for dispersion paints. For the production of the cellulose fibers wood is freed of lignin and hemicellulose after disintegration by chemical digestion and then bleached with chlorine. The chips are defibrillated after this and then fractionated and dried.

Both silicon oxide products and also cellulose matting agents are objectionable from the environmental point of view.

Independently of their crystal structure, silicon oxide products present a substantial direct health hazard for humans owing to the risk of silicosis. Silicon oxide dust, whose grain size is below 10 µm, penetrates into the lungs where it causes tissue hypertrophy. It is known that acute silicosis, which may occur even after short exposure to dust containing high concentrations of silicon oxide containing dust (>20% $SiO_2$), as a rule quickly leads to alterations in the lungs and normally to early death. The long term action of small doses may frequently mean that there is a latent state lasting decades which, even after discontinuance of the exposure to dust, will still be responsible for symptoms such as a proneness to fatigue, loss of appetite, loss of weight, coughing and increasing breathlessness.

Persons having to work with silicon oxide products (as for example in manufacturing or processing operations) are subject to a high hazard. The hazard particularly applies for persons mechanically working on materials containing silicon oxide, as for example during abrasive stripping of old dispersion paints. In Germany silicosis is a notifiable industrial disease and is subject to compensation.

Cellulose fibers, which are utilized as a matting agent, must possess a high degree of whiteness in order not to compare unfavorably with silicon dioxide products having a brightness of 90 to 93%.

Cellulose with such a brightness may only be produced by an intensive and chemically aggressive bleach. The only element that causes such a powerful bleaching action is chlorine. Therefore cellulose is bleached with gaseous of dissolved chlorine—a method which in the paper industry was under considerable attack even some years ago. In fact during bleaching aromatic halides (AOX) are formed, which are classified as being carcinogenic. While for cellulose, which is employed in the paper making industry, chlorine-free bleaching methods have been developed, in the case of matting agent cellulose it is not possible presently to dispense with a chlorine bleach because of the substantially higher standard of whiteness required in accordance with the present state of the art. While alternative bleaching methods (for example ozone bleaching) are being tried out, they presently yield cellulose with a substantially lesser degree of whiteness whose use would affect the brightness of the coat of paint in an undesired fashion.

The German industrial standard (DIN) 53 778 ("Kunststoffdispersionfarbe für Innen" (plastic dispersion paint for interior use) DIN 53 778, parts 1 through 4 (August 1983) sets the following minimum requirements for paints:

Working must be possible, using commercially available equipment, by brushing, rolling or spraying. In order to meet this requirement a suitable paint viscosity and in accordance with practical requirement for airless spraying a limitation of the maximum solids grain size to 60 µm are required.

Dispersion paints must be able to be diluted with water without separating into different phases and must be compatible with toning colors.

In the case of a minimum working temperature of +5° C. the dispersion paints must still able to be applied and able to form a film, if no other minimum processing temperature is specified by the manufacturer.

Carbonate containing mineral fillers, more particularly natural and/or precipitated calcium carbonates, have already been known in the art for some time. It is only by way of example that reference should be had to the German patent publication 4,128,570 A1, which discloses carbonate containing mineral fillers, pigments or similar materials, which are characterized by a mean statistical particle diameter of 0.4 to 1.5 µm.

Such materials are unsuitable as matting agents for aqueous paint systems because they are much too fine and therefore cannot develop a matting effect.

In view of the above the following basic consideration arises: Obviously the coarser its grain distribution, the more effective a matting agent is. On the other hand a commercial product must be able to be readily processed; only by way of example it is necessary to keep to a limit for the maximum grain size of the solids of 60 µm. Independently of this the disadvantages of the above discussed prior art matting agents should be avoided.

SUMMARY OF THE INVENTION AND DESCRIPTION OF THE PREFERRED EMBODIMENTS

It is therefore an object of the invention to provide novel mineral fillers which may be employed as matting agents for aqueous paint systems, preferably interior dispersion paints, without however having the disadvantages of known fillers used for this purpose.

In accordance with the invention this aim is achieved with carbonate containing mineral fillers, and more particularly natural and/or precipitated calcium carbonates, which are characterized by the following grain size distribution:

| <61 µm: | 100% |
| <56 µm: | 95–100% |
| <40 µm: | 90–100% |
| <20 µm: | 48–95% |
| <10 µm: | 15–52% |
| <5 µm: | 9–28% |
| <1 µm: | 0–10% |
| $d_{50}$: | 9.6–20.5 µm. |

In accordance with a preferred form of the invention the grain size distribution is as follows:

| <56 µm: | 100% |
| <40 µm: | 90–100% |
| <20 µm: | 55–84% |
| <10 µm: | 20–44% |
| <5 µm: | 11–24% |
| <1 µm: | 0–6% |
| $d_{50}$: | 11.7–17.8 µm. |

A more particularly preferred grain size distribution for a filler is as follows:

| <56 µm: | 100% |
| <40 µm: | 95–99% |
| <20 µm: | 63–74% |
| <10 µm: | 26–35% |
| <5 µm: | 15–20% |
| <1 µm: | 3–6% |
| $d_{50}$: | 15.3–15.5 µm. |

In accordance with the invention the optimum grain size distribution is as follows:

| <56 µm: | 100% |
| <40 µm: | 99% |
| <20 µm: | 74% |
| <10 µm: | 26% |
| <5 µm: | 15% |
| <1 µm: | 6% |
| $d_{50}$: | 15.5 µm. |

As a matter of principle for the calcium carbonate matting agents three different raw materials are available: limestone, chalk and marble. In accordance with the invention, natural as opposed to precipitated matting agents are preferred. In accordance with the invention it is possible for any carbonate containing fillers to be employed. Dolomite is merely to be noted as a possible example.

Naturally, novel products must resemble the properties of existing and already introduced types of qualities. This applies components of white interior dispersion paints, and especially the brightness thereof. High quality commercially available matting agents have brightness values of >90%, a lower limit value, which should also be attained by carbonate containing products. Owing to such requirements for brightness, marble is in accordance with the invention to be more particularly considered. With chalk and limestone in the fineness aimed at it is more difficult to achieve the limit value of 90%. Although marble is preferred, it is possible in accordance with the invention to utilize chalk and limestone as well.

All calcium carbonates in accordance with the invention can be produced in a known fashion by comminution and classification in accordance with grain size.

Further aims, features and advantages of the invention will be gathered from the following description with reference to examples.

Firstly the properties related to the invention of products will be described in detail and, to the extent necessary, the respective method of measurement will be indicated.

1. Grain size distribution.

All fineness features named in the present patent application of the products produced in accordance with the invention were ascertained by sedimentation analysis in a gravity field using a SEDIGRAPH 5100 of the Micromeritics Company, U.S.A. This instrument is known to those in the art and is employed world wide for measuring the fineness of fillers and pigments. Measurement took place in a 0.1% by weight, aqueous $Na_4P_2O_7$ solution. Dispersion of the samples was performed ultrasonically.

The measured particle distribution was plotted in an X-Y diagram as a transit sum curve (see for example Belger, P., Schweizerische Vereinigung der Lack- und Farben-Chemiker, XVII. FATIPEC-Kongress, Lugano, 23 to 28.9.1984), the equivalent diameter in accordance with DIN 66 160, page 3 being plotted along the horizontal axis and the amount of particles in % by weight along the vertical axis.

The above defined fineness features were read off and, respectively, calculated using the curves obtained with the above described method.

2. Degree of whiteness, brightness and yellowness value.

"Degree of whiteness" or "whiteness" are terms employed to denote the color of a body which is either not colored or only slightly so.

All measurements for the degree of whiteness—presented in the form of the reflection factors Rx, Ry and Rz—were performed in accordance with the invention using an Eirepho 2000 twin beam spectrophotometer manufactured by the Datacolor Company, Switzerland, as known to those in the art.

The term brightness (Helligkeit) is defined by DIN 5033, part 1 (DIN 5033, part 1 (March 1979): Farbmessung, Grundbegriffe der Farbmetrik (Color measurement, basic terms employed in color measurement)) as being the level of light sensation. In DIN 53778, part 3 (DIN 53778, part 3: Kunststoffdispersionsfarben, Bestimmung des Kontrastverhältnisses und der Helligkeit von Anstrichen (plastic dispersion paints, determination of contrast ratio and brightness of paint coatings)) the measure of brightness employed is the standard color value Y, which corresponds to the reflection factor Ry.

In accordance with DIN 6167 (DIN 6167 (January 1980): Beschreibung der Vergilbung von nahezu weissen oder nahezu farblosen Materialien (Description of yellowing of practically white or practically colorless materials)) the yellowness value G is employed to define the yellow tinge of products with a high degree of whiteness. It may be calculated from the standard color value as described in DIN 6167, or it may be directly derived from the reflection factors Rx, Ry and Rz using the equation:

$$G = \frac{Rx - Rz}{Ry} \cdot 100$$

3. Dry film thickness.

Dry film thickness means the thickness of the layer of dry paint as determined using a digital feeler layer thickness measuring device.

4. Contrast ratio.

Contrast ratio generally means the covering power of a paint. Frequently the term "opacity" is employed. In accordance with DIN 53778, part 3, the contrast ratio is a hundred times the brightness ratio and is expressed as a percentage.

5, Sheen.

Sheen is employed to mean the degree of gloss of low-gloss surfaces, and which is only visible when viewing at a very low angle of inclination, that is to say at a large angle to the perpendicular.

Measurement of sheen is performed in accordance with DIN 67530 (DIN 67530 (January 1982): Reflektometer zur Glanzbeurteilung an ebenen Anstrich- und Kunststoffoberflächen (Reflectometers for assessment of gloss on flat paint and plastic surfaces)) using a "Color-gloss" triple angle reflectometer of the Byk Company, Germany, at an angle of incidence of 85° to a perpendicular to the surface. Such instrument is known to those in the art.

6. Wet abrasion resistance.

The wet abrasion resistance of a paint is a measurement for its resistance to chafing effects.

Testing therefor was performed using an abrasion test instrument in accordance with DIN 53778, part 2 (DIN 53778, part 2 (August 1983): Kunststoffdispersionfarben für Innen, Beurteilung der Reinigungsfähigkeit und der Wasch- und Scheuerbeständigkeit von Anstrichen (Plastic dispersion paints for interiors, assessment of cleanability and resistance to washing and scouring of paints)).

7. Film cracking.

This term is employed to signify the development of cracks during drying of the paint film. It is dependent on the thickness of the wet film applied. For assessment of film cracking, wedge testing was employed—a method familiar to those in the art.

For this purpose the paint was applied with a doctor to a metal plate with a wedge-like recess (0–3 mm) starting at the lowest point. The coated plate was then held for 48 hours under normal climatic conditions (23°±2° C./50±5% relative humidity). If crack formation occurred, it would start at a certain dry film thickness so that there was a limiting line as far as which the paint film dried without cracking. This limit line was determined very exactly using a magnifying glass. The depth of the wedge at the limiting line was taken as a measurement for the wet film thickness to be applied in a single working step without the dry paint showing cracks.

8. Viscosity.

In the present investigation all viscosity values were measured using a Viscotester VT 500 instrument supplied by the Haake company, Germany. The instrument was fitted with the measuring unit MV and the measuring head MV 3. It is a question of a controlled shear rate revolving cylinder viscosimeter with a measuring container as a stator and the measuring head as the rotor.

Measurements were taken at constant shear rates (D) of 10, 40 and 100 $s^{-1}$.

9. Brushability and recoatability.

Brushability of a paint denotes the quality of the first coat (priming coat). Recoatability means in accordance with DIN 53778, part 4 (DIN 53778, part 4 (August 1983): Kunststoffdispersionsfarben, Prüfung der Überstreichbarkeit nach festgelegter Trocknungszeit (Plastic dispersion paints, examination of recoatability after a given drying time)) the property of a coat of paint after a given drying time to bear one or more further similar paint coats without there being interfering interaction between the coats of paint.

Testing was performed in accordance with DIN 53778, part 4. In addition to the basic indication of "recoatable/ non-recoatable" the quality of the paint coating was assessed by eye as well.

10. Storage stability.

Storage stability is the time-related viscosity behavior of paints.

One week after production of the paints viscosity was examined at a shear rate of 10 s$^{-1}$ and 40 s$^{-1}$. Then the paints were stored in a sealed container at 50° C. and after 7, 14 and 28 days viscosity was measured again.

The change in the values during 28 days was assessed. The less the change, the better the storage stability of the paint was considered to be.

For all calcium carbonate test products marble from Carrara, Italy was employed. The test products were only produced by comminution and screening the quarried marble.

For screening, a channel wheel screener (model 100 MZR produced by the company ALPINE AG) was utilized, which rendered possible the separation of fine materials with a $d_{97}$ value of 2–80 µm. From the pre-comminuted feed material ($d_{50}$=20–25 µm) the coarse fraction was screened out. As a working product the fine material with the required $d_{50}$ value was obtained. Since two feed materials were employed, which substantially differed as regards the width of their grain range, for an identical mean equivalent diameter fines with grain distributions differing in width and, respectively, slope were produced.

Numerous, extensive test series were performed in connection with a doctoral thesis. Finally as optimum calcium carbonates eleven different products in a range of $d_{50}$=9.6–20.5 were screened out. In order to comply with the practical requirement of having a 60 µm maximum grain size, there was then a protective screening off at 56 µm.

The following tables I and II will show the grain size distributions of such eleven products in accordance with the invention. In the tables the whiteness values are also included.

TABLE I

| Property | VP | VP | VP | VP | VP | VP |
|---|---|---|---|---|---|---|
| Grain size distribution | | | | | | |
| <56 µm [%] | 100 | 100 | 100 | 100 | 100 | 100 |
| <40 µm [%] | 93 | 98 | 99 | 100 | 100 | 100 |
| <20 µm [%] | 48 | 63 | 74 | 84 | 89 | 95 |
| <10 µm [%] | 15 | 20 | 26 | 31 | 39 | 51 |
| <5 µm [%] | 9 | 11 | 15 | 16 | 22 | 27 |
| <1 µm [%] | <3 | 4 | 6 | <3 | 5 | 3 |
| $d_{50}$ [µm] | 20.5 | 17.4 | 15.5 | 13.6 | 12.2 | 9.9 |
| Degree of whiteness | | | | | | |
| Rx [%] | 90.9 | 91.9 | 92.7 | 93.1 | 93.2 | 93.5 |
| Ry [%] | 90.8 | 91.7 | 92.6 | 93.0 | 93.1 | 93.3 |
| Rz [%] | 90.0 | 90.9 | 91.7 | 92.1 | 92.2 | 92.5 |
| Yellowness value [%] | 1.1 | 1.1 | 1.1 | 1.1 | 1.1 | 1.1 |

(a) Matting agents with a steep slope of grain size distribution.

TABLE II

| Property | VP | VP | VP | VP | VP 11 |
|---|---|---|---|---|---|
| Grain size distribution | | | | | |
| <56 µm [%] | 100 | 100 | 100 | 100 | 100 |
| <40 µm [%] | 90 | 95 | 98 | 99 | 99 |
| <20 µm [%] | 55 | 63 | 70 | 77 | 87 |
| <10 µm [%] | 31 | 35 | 39 | 44 | 52 |
| <5 µm [%] | 18 | 20 | 22 | 24 | 28 |
| <1 µm [%] | <3 | 3 | 3 | 3 | 4 |
| $d_{50}$ [µm] | 17.8 | 15.3 | 13.5 | 11.7 | 9.6 |
| Degree of whiteness | | | | | |
| Rx [%] | 92.6 | 93.3 | 93.3 | 93.4 | 93.4 |
| Ry [%] | 92.4 | 93.0 | 93.0 | 93.2 | 93.2 |
| Rz [%] | 91.4 | 92.0 | 92.0 | 92.1 | 92.3 |
| Yellowness value [%] | 1.4 | 1.5 | 1.4 | 1.4 | 1.3 |

(b) Matting agents with a low slope of grain size distribution.

The grain size distributions of the experimental products were evenly staggered and pairs with practically identical mean equivalent diameters and a low or, respectively, steep curve were formed. The brightness values of all eleven products in accordance with the invention comply with a criterion Ry>90% and with a value over 92% eight of the eleven are even far above the minimum requirement.

Production and application of the paints.

The paints were produced in two stages: preparation of the stock and manufacture of the paints as such.

Firstly the stock was prepared by mixing its ingredients together, same being water and the additives. These additives are all additives as known in the prior art and are readily commercially available. For the stock the following additives were employed: two different dispersing agents, a preserving agent, a defoamer, two different thickening agents and a pH regulator. The quantity of stock is made such that it is sufficient for all paints of an experimental series. A large amount of stock was made, since such mixture should at least be able to be left to stand overnight, before the further ingredients were incorporated in it so that trapped air can escape. Furthermore this approach ensures that all paints contain exactly the same mixed in amounts of additives and water.

During mixing the stock the two thickening agents, the pH regulator, the two dispersing agents, the preserving agent and the defoamer are mixed in one after the other using a laboratory dissolver (with surface speed of the agitator disk of 3.8 m/s) in water. The complete mixture is stirred for 3–5 minutes and then sealed off for 15 hours at least for air removal.

After the air removal phase a portion of the stock is taken as is necessary for each experimental paint. Using the dissolver with the rotor rotating slowly the fillers are incorporated in sequence—from the finest one to the coarsest one—and the mixture is dispersed for 10 minutes at a surface speed of 9.4 m/s. Then the speed is reduced to 3.8 m/s again and the binding agent is added as the last ingredient stirred in for 5 minutes.

The finished paint must be allowed to stand for at least 15 hours prior to application.

Application of the paint is performed in the following manner:

In order to test the optical characteristics of the paint same was applied using a doctor with a gap height of 150 µm to contrast cards. The doctor was a broad blade with a predetermined distance from the substrate (the gap height). Contrast cards are made of cardboard having a partly white and partly black coating.

Prior to measurements the paint layers so applied were held for 48 hours in a normal atmosphere (23°±2° C./50±5% rel. humidity).

For the examination of the wet abrasion resistance the paint was applied using a doctor to black Lenetta film (pieces of roughened PVC film). After 28 days of storage in a normal atmosphere paint films of even thickness had to form with a layer thickness of 100±5 μm.

In a first test section the connection between grain size distribution of the $CaCO_3$ matting agent test products and the matting action at a constant matting agent content was to be investivated.

A content of matting agent equal to 10% of the overall amount of paint was selected. This high value will clearly indicate whether a product is too coarse, for the matting agent has a decided effect on the roughness of the paint surface. On the one hand it is important for low sheen, while on the other hand surfaces with an excessive grain may be produced if specifically a very coarse matting agent is employed. The consequence of this is such paints will have an undesired, excessive tendency to collect dirt.

The following basic paint formulation without a matting agent was utilized for all tests:

TABLE 3

Basic test formulation without matting agents.

| Ingredient | % wt. | % vol. |
|---|---|---|
| Binding agent (vinyl acetate-ethene copolymer) | 11.0 | 16.4 |
| White pigment (rutile: $TiO_2$, $d_{50} = 0.3$ μm) | 6.0 | 2.3 |
| Filler I (powdered marble $d_{50} = 0.9$ μm) | 12.5 | 7.3 |
| Filler II (powdered marble $d_{50} = 2.6$ μm) | 31.9 | 18.6 |
| Filler III (talcum powder $d_{50} = 9.4$ μm) | 5.0 | 2.9 |
| Dispersant (Na salt of a polyacrylic acid) | 0.3 | 0.4 |
| Dispersant (Na polyphosphate) | 1.3 | 1.9 |
| Preserving agent (chloracetamide based) | 0.2 | 0.3 |
| Defoamer (white oil based) | 0.2 | 0.4 |
| Thickening agent (polyurethane) | 4.6 | 7.3 |
| Thickening agent (methyl-hydroxyl-ethyl-cellulose) | 0.3 | 0.4 |
| pH regulator (NaOH) | 0.2 | 0.3 |
| Deionized water | 26.5 | 41.5 |
| Total | 100.0 | 100.0 |

In this first test series, in addition to the eleven paints with matting agent test products, the initial paint is examined without any matting agent as a control or null sample.

The twelve paints were applied to contrast cards to examine significant paint properties—sheen, brightness and contrast ratio. In table 4 the results of measurement are presented, in which respect in addition the layer thickness of the dry paint (the dry film thickness) is indicated.

TABLE 4

Sheen values: matted paints compared with non-matted base.

| Paint number. | Matting agent | Sheen %. |
|---|---|---|
| Basis stock | nil | 11.1 |
| 1 | VP 1 | 2.2 |
| 2 | VP 2 | 2.5 |
| 3 | VP 3 | 2.8 |
| 4 | VP 4 | 3.3 |
| 5 | VP 5 | 3.6 |
| 6 | VP 6 | 4.6 |
| 7 | VP 7 | 2.6 |
| 8 | VP 8 | 2.9 |
| 9 | VP 9 | 3.2 |
| 10 | VP 10 | 3.6 |
| 11 | VP 11 | 4.2 |

All eleven $CaCO_3$ matting agent test products cause a substantial reduction in the degree of gloss at a rate of 10% by weight of the overall paint so that matt paints are produced with a surprisingly low degree of sheen. There is no significant difference between the action of matting agents with a steep and with a low slope in the grain distribution curve.

Examples of use.

In the above described manner a calcium carbonate matting agent was produced and tested for a comparison with the matting agents of the prior art in an interior dispersion paint aiming at a sheen of approximately 4%. (Quantities of matting agent necessary were determined in a further study.)

| | |
|---|---|
| 1. Matting agent (in accordance with the prior art) | silicon oxide product ($d_{50} = 16$ μm) |
| 2. Matting agent (in accordance with the prior art) | cellulose product (mean fiber length: 30 μm, mean fiber thickness 17 μm) |
| 3. Matting agent (in accordance with the invention) | calcium carbonate product ($d_{50} = 15.5$ μm.) |

All three matting agents were tested in the basic paint formulation in accordance with table 3. Departing from the composition given therein the following quantities of filler and matting agents were used:

for the first matting agent:

| | |
|---|---|
| filler I: | 10.7% by weight |
| filler II: | 30.1% by weight |
| matting agent: | 3.7% by weight | for the second matting agent:

| | |
|---|---|
| filler I: | 9.9% by weight |
| filler II: | 29.3% by weight |
| matting agent: | 5.3% by weight | for the third matting agent:

| | |
|---|---|
| filler I: | 9.0% by weight |
| filler II: | 28.4% by weight |
| matting agent: | 7.1% by weight |

The production of the paint and application thereof were performed according to the above described methods.

Results of testing.

| Properties | Number of matting | | |
|---|---|---|---|
| | 1 | 2 | 3 |
| optical | | | |
| sheen % | 4.2 | 4.0 | 4.4 |
| brightness (Ry) % | 89.6 | 89.7 | 89.2 |
| yellowness % | 2.1 | 2.3 | 2.1 |
| contrast ratio % | 97.0 | 97.0 | 96.0 |
| Dry film thickness, μm | | | |
| mechanical | | | |
| wet abrasion resistance number of scrub cycles | >1900 | >1900 | >1900 |
| cracking (3 mm wedge) mm | 0.8 | 0.9 | 1.0 |
| Working properties | | | |
| viscosity mPas at $D = 10$ $s^{-1}$ | 5040 | 12100 | 4590 |
| at $D = 40$ $s^{-1}$ | 2920 | — | 2600 |
| brushability | moderate | poor | good |
| recoatability | moderate | poor | good |
| storage stability | moderate | moderate | good |

The results of the measurements show that the matting agent in accordance with the invention possesses remarkably good properties. With the same matting effect (practically the same sheen values) the working properties are surprisingly improved over those of matting agents in accordance with the prior art. Viscosity is lower at every rate of shear so that application of the paint was facilitated. Brushability and recoatabilty are improved with the result that even after the first coat of paint, but also after applying a number of coats, more even and more perfect coats are produced. Owing to the matting agent in accordance with the invention there is improved storage stability. In addition to the better working properties the matting agent in accordance with the invention leads to paint drying properties superior to those of the prior art, as is shown by thicker wet paint film drying without cracking.

More particularly the invention leads to the following advantages:
improved brushability and recoatability of the paint,
improved paint viscosity,
improved paint storage stability,
reduced tendency to crack during drying,
increased economy owing to lowering of material costs and replacement of environmentally objectionable products by the matting agent in accordance with the invention to which such objections do not apply as regards production, use and its inherent nature.

What is claimed is:

1. A liquid coating material for application to surfaces comprising a liquid stock and grains of a calcium carbonate material comprising grains made from a natural calciuum carbonate selected from the group consisting of limestone, chalk and marble, the grains having a size distribution of:

| <61 μm: | 100% |
| <56 μm: | 95–100% |
| <40 μm: | 90–100% |
| <20 μm: | 48–95% |
| <10 μm: | 15–52% |
| <5 μm: | 9–28% |
| <1 μm: | 0–10% |
| $d_{50}$: | 9.6–20.5 μm. |

2. A liquid coating material according to claim 1 wherein the grains comprise no more than about 10% by weight of the liquid coating material.

3. A liquid coating material according to claim 1 wherein the coating material comprises a liquid paint.

4. A liquid coating material according to claim 1 wherein the coating material comprises a plastic dispersion.

5. A method of producing a liquid coating material comprising the steps of providing a liquid stock; forming calcium carbonate particles by comminuting natural calcium carbonate selected from the group consisting of limestone, chalk and marble; segregating the calcium carbonate particles so that they have a particle size distribution as follows:

| <61 μm: | 100% |
| <56 μm: | 95–100% |
| <40 μm: | 90–100% |
| <20 μm: | 48–95% |
| <10 μm: | 15–52% |
| <5 μm: | 9–28% |
| <1 μm: | 0–10% |
| $d_{50}$: | 9.6–20.5 μm; | and mixing the segregated calcium carbonate particles having the particle size distribution into the stock.

* * * * *